United States Patent
Wu et al.

(10) Patent No.: US 9,410,041 B1
(45) Date of Patent: Aug. 9, 2016

(54) METHOD OF SURFACE MODIFYING GRAPHENE

(71) Applicant: Enerage Inc., Yilan County (TW)

(72) Inventors: Mark Y. Wu, Yilan County (TW); Cheng-Yu Hsieh, Yilan County (TW); Cheng-Shu Peng, Yilan County (TW)

(73) Assignee: ENERAGE INC., Wujie Township, Yilan County (TW)

( * ) Notice: Subject to any disclaimer, the term of this patent is extended or adjusted under 35 U.S.C. 154(b) by 0 days.

(21) Appl. No.: 14/642,170

(22) Filed: Mar. 9, 2015

(30) Foreign Application Priority Data

Jan. 30, 2015 (TW) .............................. 104103272 A

(51) Int. Cl.
*C01B 31/02* (2006.01)
*C09C 1/44* (2006.01)
*C01B 31/04* (2006.01)

(52) U.S. Cl.
CPC ............... *C09C 1/44* (2013.01); *C01B 31/0492* (2013.01)

(58) Field of Classification Search
CPC  C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32

See application file for complete search history.

(56) References Cited

U.S. PATENT DOCUMENTS

| 7,745,528 B2 | 6/2010 | Prud'Homme et al. |
| 2010/0056819 A1 | 3/2010 | Jang et al. |
| 2014/0234200 A1* | 8/2014 | Tour .................... C01B 31/0446 423/448 |

OTHER PUBLICATIONS

Sheng, et al., Catalyst-Free Synthesis of Nitrogen-Doped Graphene via Thermal Annealing Graphite Oxide with Melamine and Its Excellent Electrocatalysis, ACSNano 2011; 5(6): 4350-4358.*

* cited by examiner

*Primary Examiner* — Daniel C McCracken
(74) *Attorney, Agent, or Firm* — Muncy, Geissler, Olds & Lowe, P.C.

(57) ABSTRACT

A method of surface modifying graphene is disclosed and includes placing powder-like graphene into a closed container, heating up to a preset impurity detaching temperature higher than 100° C. so as to detach the impurity from the surface of graphene, further adjusting the treatment temperature to a preset surface modifying temperature, and injecting the gaseous surface modifying agent to be physically adsorbed by the surface of graphene. Thus, surface modified graphene is formed. The surface modifying temperature is higher than the sublimation temperature of the surface modifying agent and less than the decomposition temperature of the surface modifying agent. Therefore, the present invention is simpler and safer because of only physical adsorption used and no chemical reaction involved. Dispersibility of surface modified graphene in the solution is greatly increased to improve uniformity and enhance the performance of the final product formed of surface modified graphene.

4 Claims, 5 Drawing Sheets

# METHOD OF SURFACE MODIFYING GRAPHENE

CROSS-REFERENCE TO RELATED APPLICATION

This application claims the priority of Taiwanese patent application No. 104103272, filed on Jan. 30, 2015, which is incorporated herewith by reference.

BACKGROUND OF THE INVENTION

1. Field of the Invention

The present invention relates generally to a surface modifying method of performing a surface modifying process on graphene, and more specifically to a method of adjusting the treatment temperature in vacuum to cause the surface of graphene powder to adsorb the gaseous surface modifying agent so as to modify the surface of graphene.

2. The Prior Arts

Monolayer graphite, also called graphene, is substantially an excellent material formed of a mono layer of carbon atoms, which are tightly bonded with $sp^2$ hybrid orbital in a two-dimensional form of hexagonal honeycomb crystal. Since its thickness is only one carbon diameter about 0.335 nm and the graphitic bond is a hybrid chemical bond exhibiting the properties of a covalent bond and a metallic bond, graphene is a perfect material for electrical insulation and thermal conduction. In 2004, Andre Geim and Konstantin Novoselov at the University of Manchester in the UK successfully proved that graphene is obtained from a piece of graphite by using adhesive tape, and were thus awarded the Nobel Prize in Physics for 2010. Since then, research centers, academic organizations and related manufactures around the world have spent a great deal of resources to try to apply graphene to various industrial fields.

Specifically, graphene is the thinnest material in the world, and its electrical conductivity is higher than carbon nanotube and diamond by several times. In particular, electron mobility of graphene at normal temperature is also higher than carbon nanotube and silicon crystal, and its electrical resistivity is even lower than copper and silver. Thus, it is currently the material with lowest resistivity. Furthermore, transparent electrodes formed of graphene and carbon nanotube exhibits various advantages like high flexibility and low reflectivity, and becomes one of the best options for modern flexible electronic materials.

However, graphene has one disadvantage in actual applications. In comparison with the traditional dispersion containing carbon nanotube, the dispersion formed by dispersing graphene in some dispersion medium has poor performance in a coating process. The reason is that graphene is easy to aggregate and stack together such that its dispersion effect is very limited. It is one primary bottleneck for current industries to exploit the technology to manufacture a thin film formed of mono layer graphene which does not stack to each other and still keeps in contact for electrical connection among the graphene sheets.

To overcome the above problem, many advanced skills have been developed. Some examples will be briefly described in the following context.

In US publication No. 2010/0056819 invented by Bor Z. Jang and Aruna Zhamu, a process for producing nanographene platelets (NGPs) that are both dispersible and electrically conducting is disclosed. The process employs an oxidation treatment. High reactive oxidant gas is reacted with graphitic material, carbon material or carbon nanotube to obtain the dispersible NGP material possessing oxygen containing functional groups. However, the reaction gas in use is mostly strong corrosive, and the product formed after the oxidation treatment contains high amount of oxygen, leading to poor performance in electrical conductivity.

In addition, U.S. Pat. No. 7,745,528 taught functional graphene-rubber nanocomposites. Functionalized graphene sheets (FGS) used to form the nanocomposite is prepared by first oxidizing the graphite material to obtain oxidized graphite or separate swollen graphene sheets, and then fast heating the oxidized graphite or separate swollen graphene sheets so as to release the gas contained inside. The FGS contains oxygen rich functional groups. However, the amount of oxygen rich functional groups in the FGS has a wide variable range from 5% to 40% calculated according to the actual oxygen content. It is thus hard to precisely control the content of the functional group, and the electrical properties are not well satisfied.

From the above description for the prior arts, it is well known that all the traditional surface treatments of graphene are implemented by specific chemical reaction. Not only the process is not easily controlled, but also toxic matters are generated in the scaled up step for mass production and a crucial problem of environment protection is resulted in. Such a process is adverse for mass production of graphene in practical industrial applications.

Therefore, it greatly needs a new surface modifying method by means of physical adsorption to perform a surface modifying process on graphene without using any chemical reaction, thereby preventing the side effects generated by reactive chemicals and completely overcoming the problems in the prior arts.

SUMMARY OF THE INVENTION

The primary objective of the present invention is to provide a method of surface modifying graphene for performing a surface modifying process on graphene so as to improve dispersibility of graphene in a solution. In particular, uniformity of graphene in the subsequent blending o mixing process is thus improved and the performance of final products formed of the surface modified graphene is enhanced.

Specifically, the surface modifying method for graphene according to the present invention is initially performed by a surface cleaning step, in which a graphene powder is placed in a closed container in vacuum, the graphene powder is heated up to a treatment temperature higher than a preset impurity desorption temperature for a period of time. The impurity desorption temperature is higher than 100° C. As a result, the impurity attached to the surface of the graphene powder is desorbed by vacuum and heating and modified graphene with the clean surface is thus obtained.

Next, a surface treatment step is performed. The treatment temperature is adjusted to a surface modifying adsorption temperature, and a gaseous surface modifying agent is injected such that the surface modifying agent is adsorbed on the surface of the graphene powder due to a physical adsorption effect and surface modified graphene is obtained. The surface modifying adsorption temperature is higher than the sublimation point of the surface modifying agent and lower than the thermal decomposition temperature of the surface modifying agent. In other words, the surface modifying agent is certainly sublimated without decomposition.

The method of the present invention thus employs the effect of physical adsorption without using any corrosive chemicals for chemical reaction such that reaction waste generated in the method is reduced, and the advantages of environmental protection and convenience in use are provided. In addition, surface modified graphene obtained by the present invention has excellent dispersibility so as to improve uniformity in the latter blending or mixing process. As a result, the final products formed of modified graphene have excellent properties.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
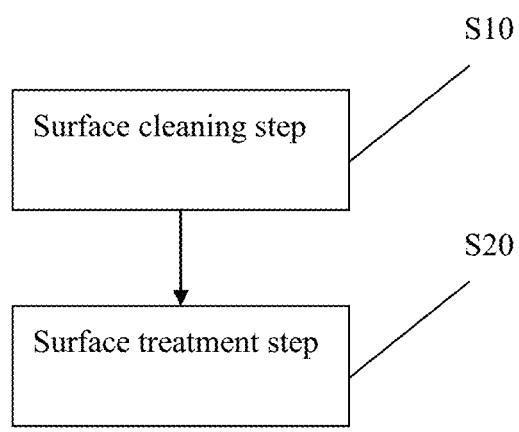
FIG. 1 is a flowchart showing the method of surface modifying graphene for performing a surface modifying process on graphene according to the present invention.
Figure 2:
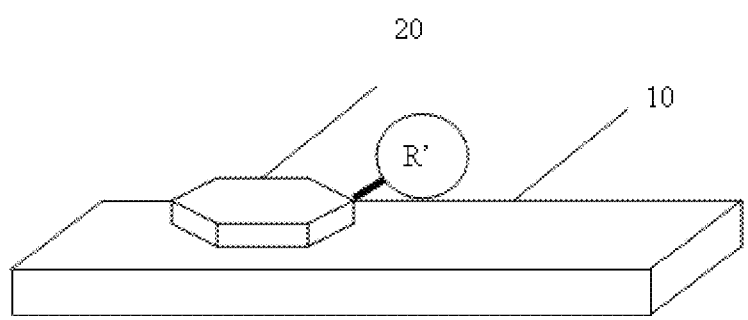
FIG. 2 is a view showing the effect of physical adsorption for the surface modified graphene according to the present invention.

Please refer to FIG. 1 showing a flowchart for the method of surface modifying graphene for performing a surface modifying process on graphene according to the present invention. As shown in FIG. 1, the method of the present invention generally comprises a surface cleaning step S10 and a surface treatment step S20 sequentially performed to improve surface property and facilitate the subsequent processes.

The method of the present invention begins at the surface cleaning step S10. A graphene powder is placed in a closed container in vacuum and then heated up to a treatment temperature higher than a preset impurity desorption temperature for a period of time. A desorption process is caused to perform on the graphene powder by vacuum and heating, and any impurity originally attached to the surface of the graphene powder is desorbed and removed because the impurity will decompose into gas, which disperses away. Since graphene itself is a nanometer material with a considerable surface area, the surface of graphene can easily adsorb micro particles or impurities like pollutive oil molecules. The surface cleaning step S10 of the present invention can effectively remove these impurities and pollutants to obtain graphene with considerably clean surface. That is, the surface of graphene has a perfect hexagonal structure, thereby facilitating the latter adsorption process for the surface modifying agent and enhancing the effect of surface modification.

It is preferred that the pressure in vacuum is lower than $10^{-2}$ torr, and the impurity desorption temperature is higher than 100° C.

Subsequently, the surface treatment step S20 is performed. Specifically, the treatment temperature is adjusted to a surface modifying adsorption temperature and a gaseous surface modifying agent is injected such that the surface modifying agent is adsorbed by the surface of the graphene powder due to a physical adsorption effect. Thus, surface modified graphene is obtained and the method of surface modifying graphene is accomplished.

The above surface modifying agent has a sublimation point and the surface modifying adsorption temperature should be higher than the sublimation point of the surface modifying agent and lower than the thermal decomposition temperature of the surface modifying agent such that the surface modifying agent is assured to sublimate and not decompose.

More specifically, the surface modifying agent with the effect of physical adsorption is specified by a chemical formula, Rx-Ry', R is selected from at least one group of benzene ring, pyridine and triazine, R' is selected from at least one group of amino, alkoxy, carbonyl, carboxyl, acetoxy, amido, alkyleneoxy, dimethylamino and alkyleneoxycarboxyl, $1 \leq x \leq 4$ and $0 \leq y \leq 10$. The preferred embodiment of the surface modifying agent is selected from a group consisting of at least one of benzoic acid, o-phthalate acid and melamine.

One primary aspect of the present invention is that the surface modifying agent has a structure of at least one benzene ring or at least one hexagonal heterocyclic structure, which is similar to a hexagonal structure formed of six carbon atoms. As a result, when the surface modifying agent is adsorbed by the graphene powder, an effect of π-π (stacking is generated besides common physical adsorption.

Therefore, even the graphene powder modified by the surface modifying agent is once again treated by the surface cleaning step S10, the surface modifying agent adsorbed by the graphene powder will not be desorbed. It is crucial to surely remove the impurities from the graphene powder in the surface cleaning step S10 so as to form strong adsorption between the graphene powder and the surface modifying agent.

To more clearly explain the key features of the present invention, two examples will be described in detail to help those who are skilled in this field well understand the actual operation of the surface modifying method.

Example 1

Here, melamine is selected as the surface modifying agent.

First, graphene sheets are well mixed with melamine and then placed in the oven, which is evacuated to vacuum with a pressure less than $10^{-2}$ torr. Then, the oven is heated up to 200° C., and the surface cleaning step is performed on the graphene sheets for 3 hours to remove the impurity on the surface. The surface modifying step is performed. The oven is further heated up to 310° C. and kept at this temperature for 2 hours. As a result, the surface modifying agent sublimates and is adsorbed by the considerably clean surface of the graphene sheets. The graphene powder having modified surface is manufactured.

Figure 3:
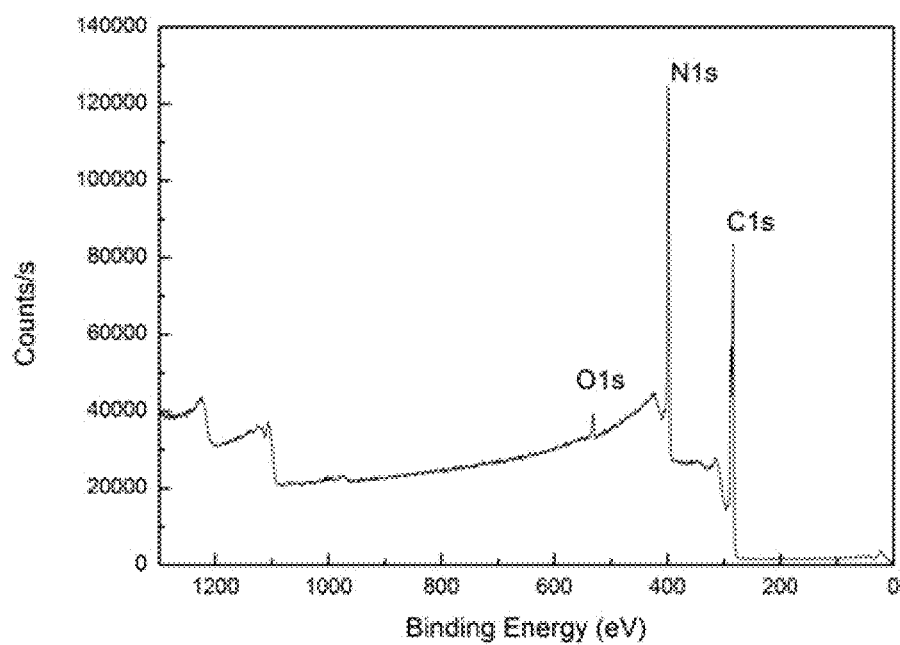
FIG. 3 is an X-ray spectrum for the surface modified graphene powder.
Figure 4:
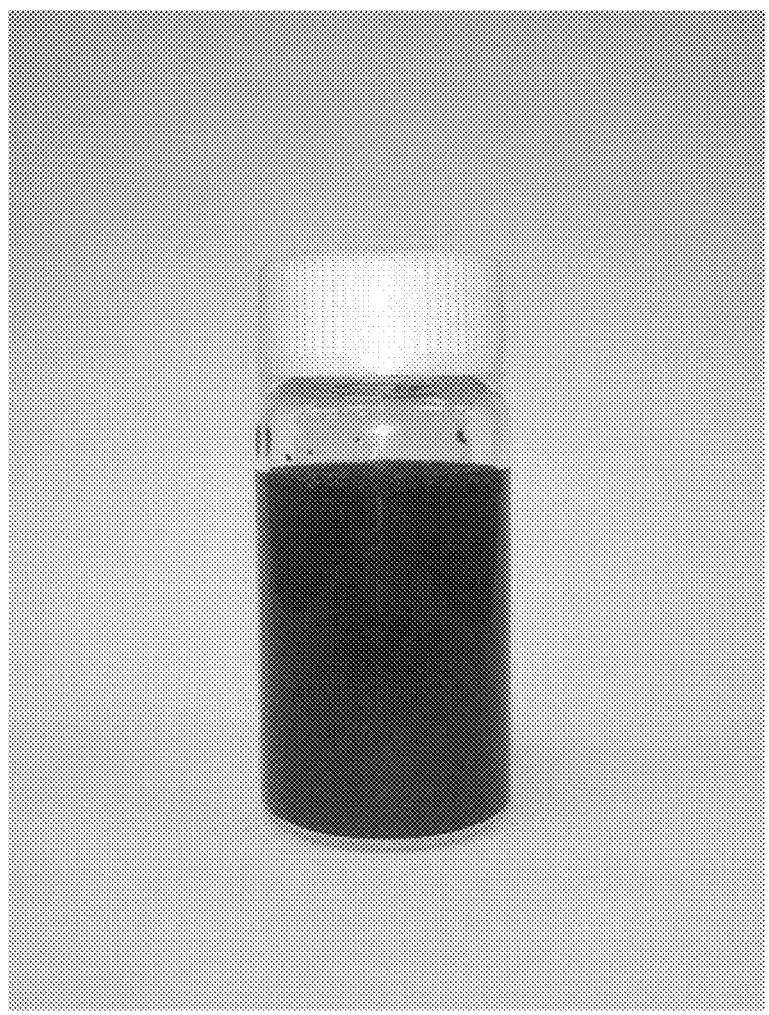
FIG. 4 is a view showing the graphene powder dispersed in water.
Figure 5:
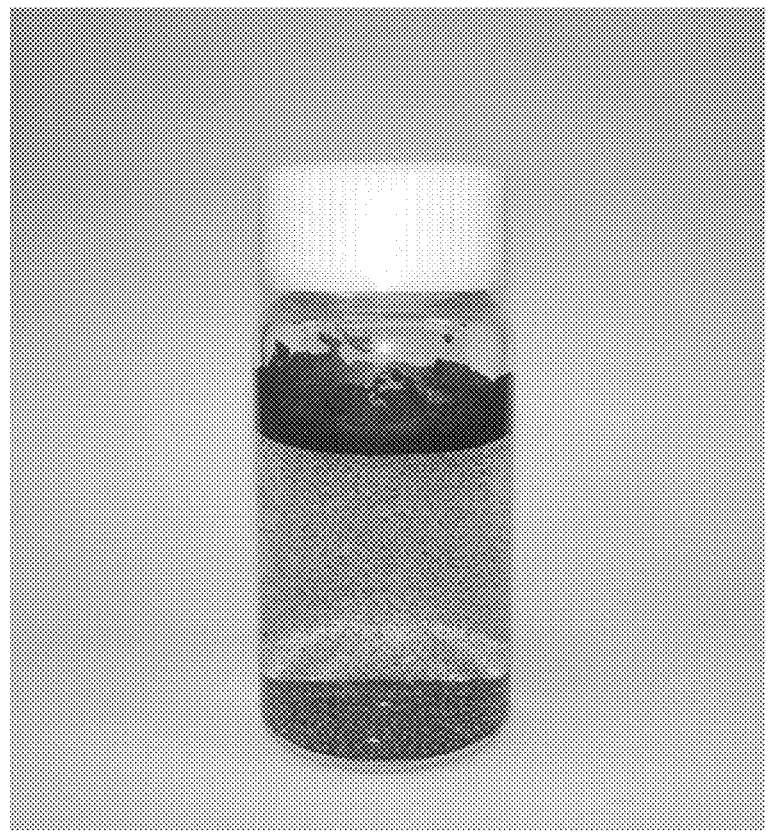
FIG. 5 is a view showing the original graphene sheets dispersed in water.

FIG. 3 shows an X-ray spectrum for the surface modified graphene powder, and it is clearly proved that the surface has a nitrogen containing functional group. FIG. 4 illustrates the state, in which the graphene powder dispersed in water, and FIG. 5 is a view showing the original graphene sheets dispersed in water. By comparing FIGS. 4 and 5, it is found that the surface of the surface modified graphene contains the surface modifying agent and forms space barrier, thereby obviously enhancing dispersion.

Example 2

This time, o-phthalate acid is selected as the surface modifying agent.

Figure 6:
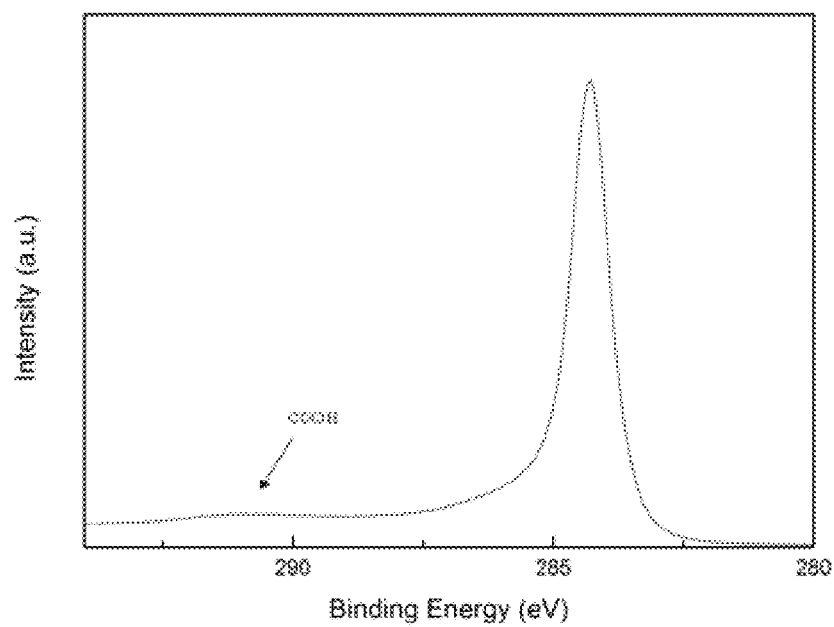
FIG. 6 is an X-ray spectrum for the surface modified graphene powder.

The graphene sheets is blended and mixed with o-phthalate acid, and the mixture is placed in the oven, which is evacuated to vacuum with a pressure less than $10^{-2}$ torr. The oven is heated up to 200° C., and the surface cleaning step is performed on the graphene sheets for 3 hours. The oven is further heated up to 400° C. and kept at this temperature for one hour such that the surface modifying agent sublimates and is adsorbed by the clean surface of the graphene sheets. The graphene powder having modified surface is obtained. FIG. 6 is an X-ray spectrum for the surface modified graphene powder. It is proved that the graphene powder actually has a good effect of dispersion in water.

From the above-mentioned, one aspect of the present invention is that the surface cleaning and adsorption steps are employed to modify the surface property of the graphene powder so as to facilitate the blending process for the graphene powder in liquid. Therefore, the present invention provides technical features different from the prior arts, and particularly does not use the risky process like oxidizing graphite material or re-reducing oxidized graphite to control the oxygen containing functional group. The present invention still does not perform the process of functionalizing edge functional groups on the graphite material for a gaseous reaction. Thus, not only any toxic or risky chemicals are avoided, but also operation safety is quite ascertained.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method of surface modifying graphene for performing a surface modifying process on graphene, comprising:
   a surface cleaning step for placing a graphene powder mixed with a surface modifying agent in a closed container in vacuum, heating the graphene powder up to a treatment temperature higher than a preset impurity desorption temperature for a period of time to desorb an impurity attached to the surface of the graphene powder by vacuum and heating such that the impurity is removed due to thermal decomposition into gas dispersing away; and
   a surface treatment step for adjusting the treatment temperature to a surface modifying adsorption temperature that is higher than the sublimation point of the surface modifying agent and lower than a thermal decomposition temperature of the surface modifying agent and injecting a gaseous surface modifying agent having a sublimation point such that the surface modifying agent is adsorbed on the surface of the graphene powder due to a physical adsorption effect of π-π stacking and surface modified graphene is obtained to accomplish the method of surface modifying graphene.

2. The method as claimed in claim 1, wherein the closed container in vacuum has pressure lower than $10^{-2}$ torr, and the impurity desorption temperature is higher than 100° C.

3. The method as claimed in claim 1, wherein the surface modifying agent is specified by a chemical formula, Rx-Ry', R is selected from at least one group of benzene ring, pyridine and triazine, R' is selected from at least one group of amino, alkoxy, carbonyl, carboxyl, acetoxy, amido, alkyleneoxy, dimethylamino and alkyleneoxycarboxyl, $1 \leq x \leq 4$ and $0 \leq y \leq 10$.

4. The method as claimed in claim 1, wherein the surface modifying agent is selected from a group consisting of at least one of benzoic acid, o-phthalate acid and melamine.

\* \* \* \* \*